Patented Aug. 16, 1932

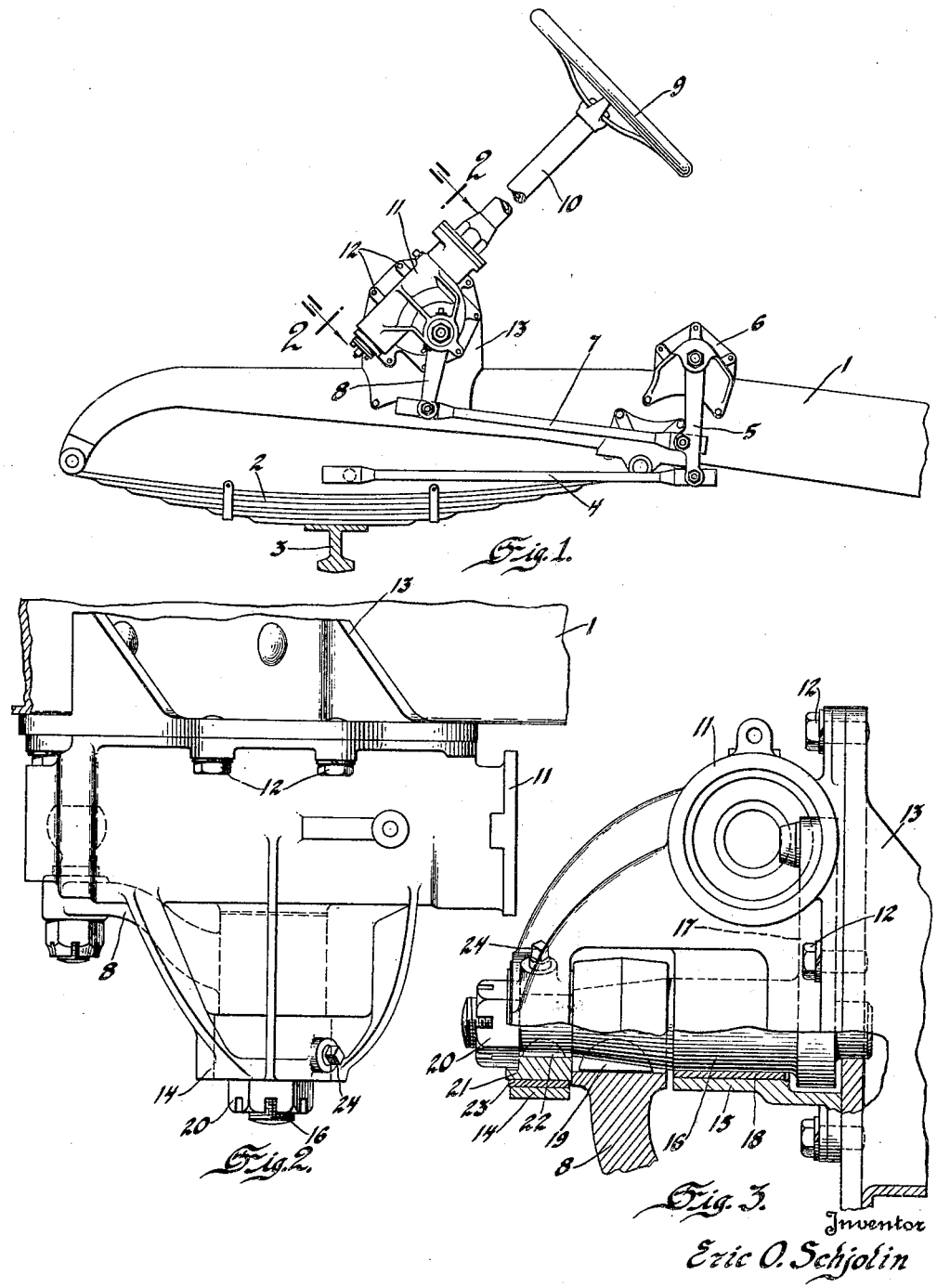

1,872,012

UNITED STATES PATENT OFFICE

ERIC OLLE SCHJOLIN, OF BIRMINGHAM, MICHIGAN, ASSIGNOR TO YELLOW TRUCK & COACH MANUFACTURING COMPANY, OF PONTIAC, MICHIGAN, A CORPORATION OF MAINE

STEERING GEAR

Application filed October 25, 1929. Serial No. 402,469.

This invention relates to steering mechanism for motor vehicles, and more particularly, to an improved gear housing and mounting for the trunnion shaft carrying the pitman arm, at the lower end of the steering column.

The common practice in convention steering gear construction is to mount the trunnion shaft carrying the gear engaging lever and cam, at its inner end in the gear casing or housing, and secure the pitman arm at its free or outer end, so that the shaft is supported only throughout a relatively small bearing surface and without any support at all at the pitman arm end. While this construction is generally satisfactory for light car use, it is not so desirable for heavy duty vehicles, such as passenger coaches and trucks, where strains of the parts are more severe and the vehicles are put to extremely hard usage and even abuse, which frequently leads to damage and breakage of the parts and serious accidents.

To overcome the objections to constructions heretofore in use is one of the objects of the present invention, which contemplates the provision, without a great increase in cost or radical change in design, of a more rugged structure and a better support for the trunnion shaft, to enable it to withstand to better advantage all the ordinary stresses it is likely to receive, whereby the life of the parts will be greatly increased and the likelihood of their failure reduced.

Various other objects and advantages of the invention will become apparent during the course of the following specification when taken in connection with the accompanying drawing, wherein Figure 1 is a side elevation of a front portion of a motor vehicle chassis in which the device forming the subject matter hereof is embodied.

Figure 2 is a plan view of the steering gear housing looking in the direction of the arrows on line 2—2 of Figure 1.

Figure 3 is an end elevation partly in section, looking toward the left in Figure 2.

Referring to the preferred, but not necessarily the only embodiment of the invention, shown in the drawing, the reference character 1 indicates a motor vehicle chassis frame flexibly supported by a multiple leaf spring 2 upon the front axle 3. As will be obvious, a pair of road wheels are swivelled on opposite ends of the dead axle 3 in the customary manner, and are connected together for unison pivotal movement by conventional steering gear linkage of which the drag bar 4 forms a part. In the arrangement illustrated in the drawing, the rear end of the drag bar is connected to a swinging lever 5, pivoted in a suitable bracket 6, mounted on the chassis frame 1, and having a second drag bar 7 extending forwardly therefrom to the pitman or steering arm 8. It will be understood, of course, that the front wheels may be linked together and connected with the steering arm in various other manners.

In the instant case, the steering column of which the pitman 8 forms a part, includes also a steering wheel 9, a post 10, and a housing or casing 11, provided with suitable flanges by which it is mounted as by bolts 12 to a bracket 13 carried by the chassis frame 1. Preferably formed integral with the casing 11, are a pair of spaced dependent forks or arms 14 and 15, forming in effect an inverted U-shaped portion. Extending through apertures in the two forks, is a trunnion or rock shaft 16 shown as having at its inner end a lever 17, carrying a portion for engagement with a gear housed within the casing 11, whereby the turning of the steering wheel 9 in the hands of the driver is transmitted to the rock shaft 16. Adjacent this inner end, the shaft 16 has a bearing in the bushing or sleeve 18, carried by the dependent portion 15. The pitman arm 8, before referred to, is mounted on a tapered portion of the rock shaft 16 in the space between the forks 14 and 15, and is splined or secured for rotation with the shaft as the means of a key 19. A nut 20, screw-threaded on the outer end of the shaft 16, fits within a recess of a spacer sleeve 21, secured as by means of a key 22 to the shaft and which is held in engagement with the side of the pitman arm 8 by the nut. This spacer sleeve has a bearing in the bushing or sleeve 23, secured in the outermost arm 14 by the set screw 24.

By this arrangement, the pitman arm, spacer sleeve and nut move together with the rock shaft as a unit, and because the key 22 insures the unison rotation of the spacer sleeve with the rock shaft, the possibility of the nut 20 working loose is eliminated. From the above description, it will be seen that the pitman arm is secured to the rock shaft in the space between the two dependent legs, and that the rock shaft has a maximum bearing surface with both its inner and outer portions firmly supported.

While the device has been described more or less specifically, it is to be understood that the invention is not limited to the exact details referred to but that such modifications may be made as come within the scope of the appended claims.

I claim:

1. In a steering mechanism, a gear casing, having a pair of laterally projecting spaced apertured forks, a trunnion shaft extending through the apertures of the forks and having a gear engaging portion at its inner end and bearing in the fork adjacent said portion, a pitman arm keyed on said shaft in the space between the forks, a spacer sleeve keyed on the outer end of the shaft and bearing in the outer fork, and a nut threaded on the shaft to hold the sleeve in engagement with the side of said pitman arm.

2. In a steering mechanism, a crank arm, a rock shaft having a tapered portion on which said arm is mounted and a reduced end portion projecting beyond the arm, motion transmitting means at the opposite end of the shaft, a housing enclosing said motion transmitting means and providing a bearing for the shaft between said means and the crank arm, an extension on said housing straddling the arm and having an apertured boss to receive said reduced end portion of the shaft, and a bearing sleeve for said end portion within the apertured boss.

In testimony whereof I affix my signature.

ERIC OLLE SCHJOLIN